United States Patent
Mueller

(10) Patent No.: US 9,636,607 B2
(45) Date of Patent: May 2, 2017

(54) SEPARATION APPARATUS FOR SEPARATION OF MATERIAL FROM A LIQUID

(71) Applicant: LASERJET 2000 AG, Bosingen (CH)

(72) Inventor: Juerg Mueller, Brittnau (CH)

(73) Assignee: LASERJET 2000 AG, Bosingen (CH)

( * ) Notice: Subject to any disclaimer, the term of this patent is extended or adjusted under 35 U.S.C. 154(b) by 132 days.

(21) Appl. No.: 14/598,275

(22) Filed: Jan. 16, 2015

(65) Prior Publication Data

US 2015/0202550 A1  Jul. 23, 2015

(30) Foreign Application Priority Data

Jan. 20, 2014  (EP) ..................... 14151789

(51) Int. Cl.
| | | |
|---|---|---|
| B01D 21/24 | (2006.01) | |
| B01D 21/04 | (2006.01) | |
| B01D 21/20 | (2006.01) | |
| B01D 21/34 | (2006.01) | |
| B23Q 11/10 | (2006.01) | |
| B24C 9/00 | (2006.01) | |

(52) U.S. Cl.
CPC ........... *B01D 21/245* (2013.01); *B01D 21/04* (2013.01); *B01D 21/20* (2013.01); *B01D 21/34* (2013.01); *B23Q 11/1069* (2013.01); *B24C 9/003* (2013.01); *B01D 2221/14* (2013.01)

(58) Field of Classification Search
CPC ...... B01D 21/04; B01D 21/20; B01D 21/245; B01D 21/34
USPC ................ 210/526, 527, 540, 159
See application file for complete search history.

(56) References Cited

U.S. PATENT DOCUMENTS

| | | | | |
|---|---|---|---|---|
| 2,085,150 A | * | 6/1937 | Gemeny | B01D 21/245 210/527 |
| 2,877,901 A | | 3/1959 | Maus | |
| 2,916,148 A | * | 12/1959 | Crane | B01D 35/16 210/527 |
| 2,941,668 A | | 6/1960 | Maus | |
| 4,396,511 A | * | 8/1983 | Neumann | E02B 8/026 210/159 |
| 5,059,312 A | * | 10/1991 | Galletti | B01D 17/0214 210/540 |
| 5,738,782 A | * | 4/1998 | Schafer | B01D 21/12 210/526 |

(Continued)

FOREIGN PATENT DOCUMENTS

| | | |
|---|---|---|
| GB | 2371243 A | 7/2002 |
| JP | H08252743 A | 10/1996 |
| JP | 2010155322 A | 7/2010 |

OTHER PUBLICATIONS

EP Search Report, dated Jun. 11, 2014, from corresponding PCT application.

*Primary Examiner* — Christopher Upton
(74) *Attorney, Agent, or Firm* — Young & Thompson

(57) ABSTRACT

The separation apparatus for separation of material from a liquid includes a tank (10) through which the liquid can be passed and a conveying device (20). The tank has a bottom (10c) on which material collects during operation. The conveying device has a conveying element (21) that can be moved along the bottom (10c) by a drive (25). The conveying element is set up for picking up material that has collected on the bottom and for conveying it out of the tank (10).

15 Claims, 4 Drawing Sheets

(56) References Cited

U.S. PATENT DOCUMENTS 6,547,964 B1 * 4/2003 Rajewski ............... B01D 21/20
                                                                                210/527

* cited by examiner

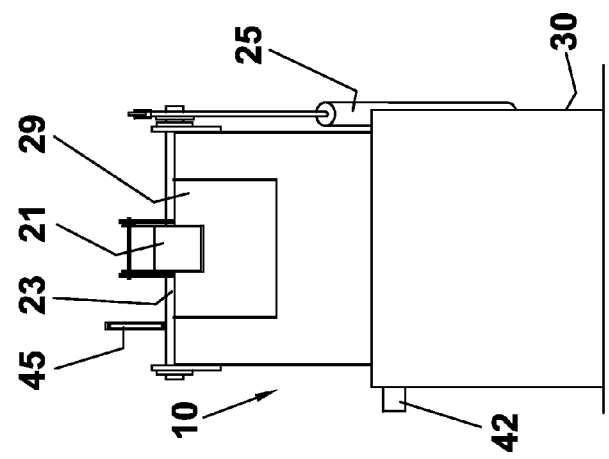
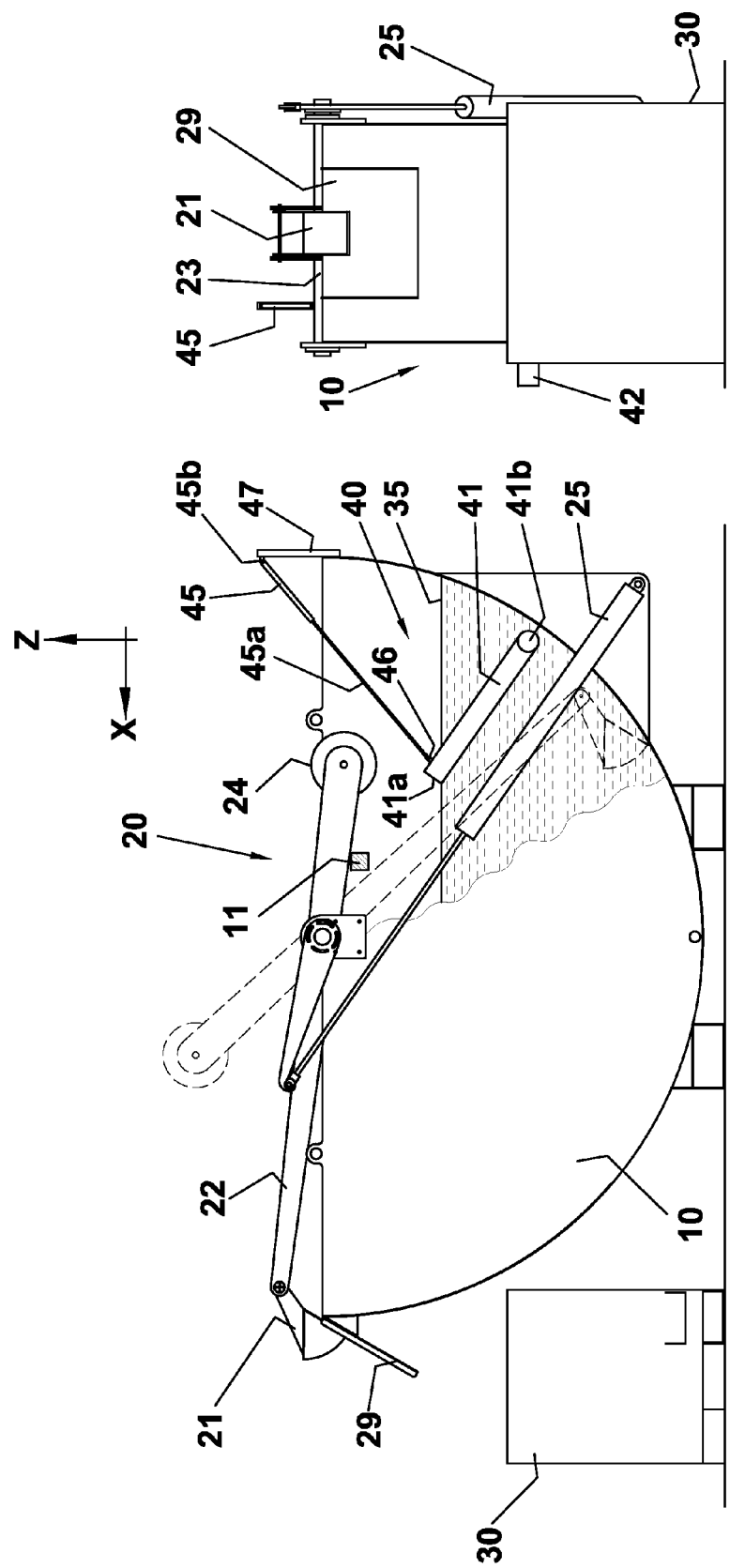

SEPARATION APPARATUS FOR SEPARATION OF MATERIAL FROM A LIQUID

FIELD OF THE INVENTION

The invention relates to a separation apparatus for separation of material from a liquid.

BACKGROUND OF THE INVENTION

In different purposes of use, liquids from which material must be separated occur. In water-jet cutting for example, sand is added to the water as an abrasive material. It is known to use a type of bag for cleaning, through which the water is passed, so that the sand can settle at the bottom of the bag. In this connection, the water overflows over the edge of the bag and flows to the ground. This type of cleaning is not very efficient.

Liquids also occur in other processing machines, for example in connection with grinding, drilling, etc., and material in the form of chips and the like must be separated from these liquids. Here, too, efficient cleaning is desirable.

SUMMARY OF THE INVENTION

It is an object of the present invention to provide for a separation apparatus that allows efficient separation of material from a liquid.

This object is accomplished by means of a separation apparatus comprising a tank, and a conveying device including a conveying element, which is movable along the bottom by means of a drive and which is configured to pick material up and convey it out of the tank. The conveying element may be mounted so as to pivot about at least two axes.

Efficient separation of material can be achieved by means of such a separation apparatus.

The separation apparatus can be designed in such a manner that wear of mechanical parts is reduced, particularly if the conveying device is designed in such a manner that the conveying element is provided as the sole mechanical part that is situated in the liquid.

BRIEF DESCRIPTION OF THE DRAWINGS

The invention is explained in the following, making reference to figures.

FIG. 2 shows the apparatus from FIG. 1 in a side view, partly in section, together with a collection container, FIG. 3 shows the apparatus from FIG. 2 in a front view.

DETAILED DESCRIPTION OF THE PREFERRED EMBODIMENTS

Figure 1:
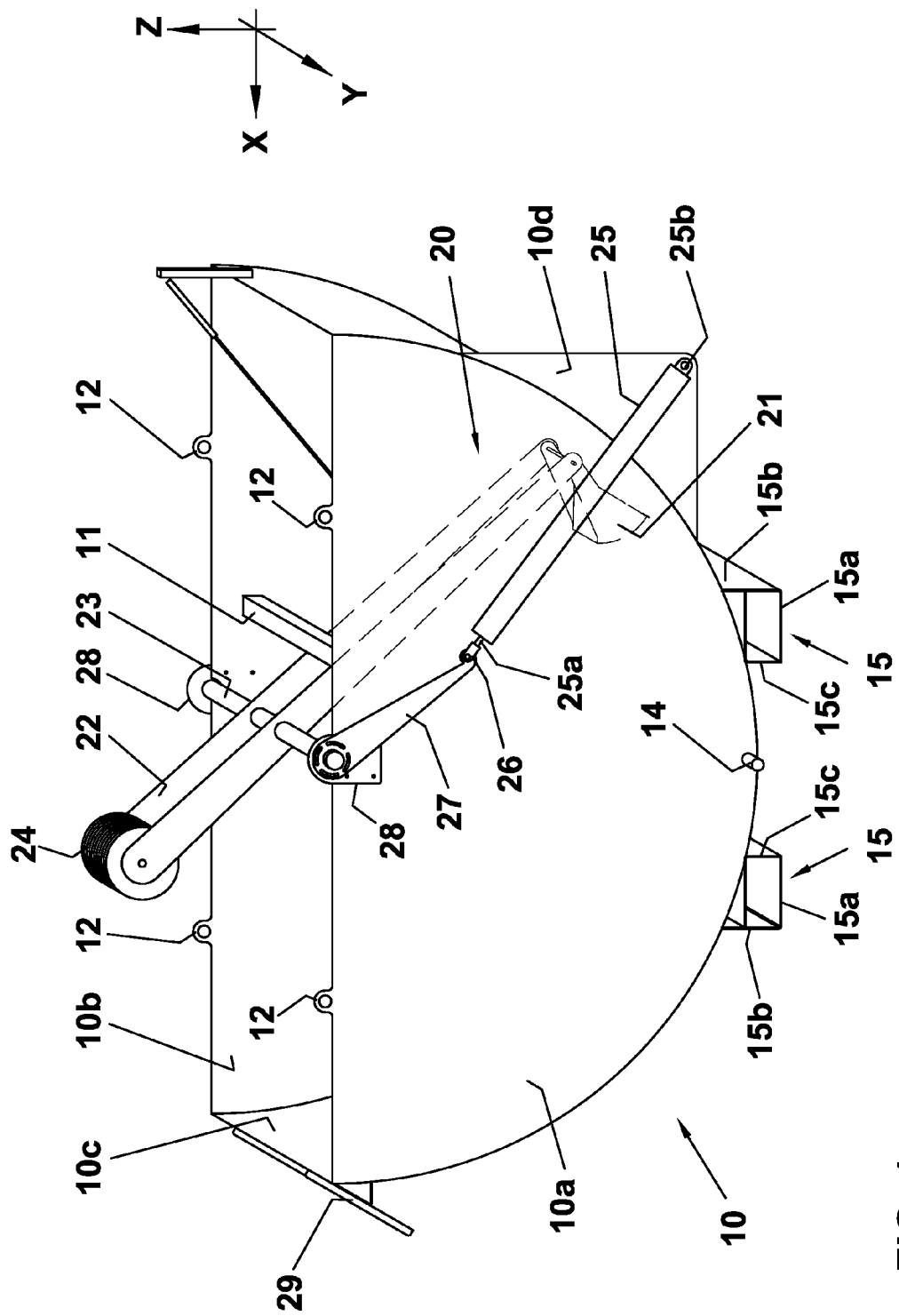
FIG. 1 shows a separation apparatus according to the invention, in a perspective view.

As FIG. 1 shows, the separation apparatus comprises a basin 10 set onto the ground, as well as a conveying device 20 arranged on the basin 10.

The basin 10 serves as a tank into which liquid containing the material to be separated can be introduced, so that the material can settle on the basin bottom. The conveying device 20 is set up for picking the material up and conveying it out of the basin 10.

Here, the basin 10 is formed from two side walls 10a, 10b, which are connected with one another by way of a bottom wall 10c. The basin is structured to be open at the top, so that the liquid can be introduced into the basin 10 above the basin edge, for example by way of an introduction pipe (not shown). The walls 10a, 10b, 10c are produced, for example, from panels or sheets that are joined together. Optionally, the side walls 10a, 10b are connected with one another by means of further connection elements, such as here, for example, using an intermediate element 11 that is disposed in the upper region of the basin 10 and gives it additional stability.

The basin 10 has connection elements 12 to which a lifting apparatus can be connected, in order to lift and move the basin 10 if necessary. Here, the connection elements 12 are configured in the form of eyes 12, which are formed on the side walls 10a, 10b. Hooks of a crane, for example, can be hooked into the eyes 12.

The bottom wall 10c is configured to be curved, so that the inside has a circular cylindrical surface, along which a conveying element 21 of the conveying device 20 can be guided.

At its foot, the basin 10 has a drain 14, which can be opened to empty the basin 10 when required.

The underside of the tank 10 lies on a support, which is formed by pipes 15 here. The respective pipe 15 has a flat underside 15a and two lateral surfaces 15b, 15c. The one lateral surface 15b is configured to be higher than the other lateral surface 15c, so that the curved bottom wall 10c of the basin 10 lies on the respective pipe 15 along two edges.

The conveying device 20 has an arm 22 that is held on a shaft 23 and here is shaped in the form of two rods that run parallel. The shaft 23 can be rotated about an axis of rotation, which runs in the Y direction according to FIG. 1.

The conveying element 21 is situated at the one end of the arm 22; a counterweight 24, which is formed by one or more disks, for example, is disposed at the other end. For balancing, the mass of the counterweight 24 and the distance thereof from the shaft 23 are coordinated with the mass of the conveying element 21 and the distance thereof from the shaft 23. Preferably, this coordination is such that a slight force is sufficient to be able to rotate the arm 22 in the empty state of the basin 10, i.e. when it is not filled with liquid and material. The arm 22 is therefore in balance, so that material to be separated can be conveyed with little force.

The shaft 23 is rotatably mounted on bearing shells 28, which are disposed on the side walls 10a, 10b of the basin 10. A drive 25 serves to rotate the shaft 23 and thereby the arm 22 with the conveying element 21. This drive is disposed outside of the basin 10, on its one side wall 10a.

Here, the drive is configured as a linear drive 25 having a linear axle 25a, which can be linearly displaced and is articulated onto a pivoting lever 27 firmly connected to the shaft 23. The linear drive 25 is mounted so as to pivot about a rotation point 25b, so that the coupling location 26 of the linear axle 25a on the pivoting lever 27 can be moved along a circular path. Here, the rotation point 25b is disposed on a panel 10d, which projects over the edge of the side wall 10a of the basin 10.

A pneumatic cylinder, for example, is suitable as a linear drive 25. Here, compressed air can be applied to the pneumatic cylinder on both sides, and it is therefore a dual-action cylinder.

Other types of drives 25 for rotating the shaft are also conceivable, for example a rotary drive. Also, the drive 25 can be designed for different modes of operation, pneumatic, electric, etc.

Seen in the conveying direction, the basin 10 has a chute 29, which is configured in the form of a slide sheet here and is affixed to the outside of the bottom wall 10c.

As FIG. 2 shows, a collection container 30 is situated next to the basin 10, above which container the chute 29 is situated. This container serves as a collection station at which the separated material is collected.

The adjustment device 40 that is set up for adjusting the level 35 of the liquid can also be seen in FIG. 2. The adjustment device 40 has a pipe 41, one end 41a of which pipe is open, and the other end 41b of which pipe opens into a connector 42 that projects outward from the side wall 10b (cf. FIG. 3) and serves to form the return flow. Depending on the design of the separation apparatus, the connector 42 is situated at a sufficiently high level so that hydrostatic pressure alone suffices to guarantee sufficient return flow of the liquid. If necessary, however, a pump can be provided to pump the liquid by way of the connector 42.

The end 41b is mounted and sealed in such a manner that the pipe 41 can be pivoted about it. During pivoting, the end 41a moves on a circular path, so that the height thereof above the base of the basin 10 changes. The level 35 of the liquid changes accordingly, in that it is conducted away by way of the end 41a and the connector 42.

A drive, which is configured as a linear drive 45 here, with a linear axle 45a that can be displaced in linear manner and is articulated onto the pipe 41, serves for pivoting the pipe 41. The linear drive 45 is mounted so as to pivot about a rotation point 45b, so that the coupling location 46 of the linear axle 45a to the pipe 41 can be moved on a circular path. Here, the rotation point 45b is disposed on a holder 47 that is attached to the basin 10.

A pneumatic cylinder, for example, to which compressed air can be applied on both sides here and which is therefore a dual-action cylinder, is suitable as the linear drive 45. It is also conceivable to use an electric drive 45 to pivot the pipe 41.

FIG. 2 shows the conveying device 20 in the end position, in which the arm 22 has been moved above the edge of the basin 22 and the conveying element 21 is situated on the chute 29. The starting position, as also shown in FIG. 1, is shown with a broken line in FIG. 2. The conveying device 20 is preferably configured in such a manner that the arm 22 and therefore the conveying element 21 can be pivoted by an angle that is greater than 90 degrees and/or smaller than 180 degrees.

As is evident from the front view according to FIG. 3, the conveying element 21 is configured to be narrower than the width of the basin 10, and disposed approximately in the center of the latter. The basin 10 can optionally be provided with guide walls (not shown in the figures), which are disposed along the movement path of the conveying element 21 and guide the material toward the conveying element 21 as it settles on the bottom of the basin 10.

Figure 4:
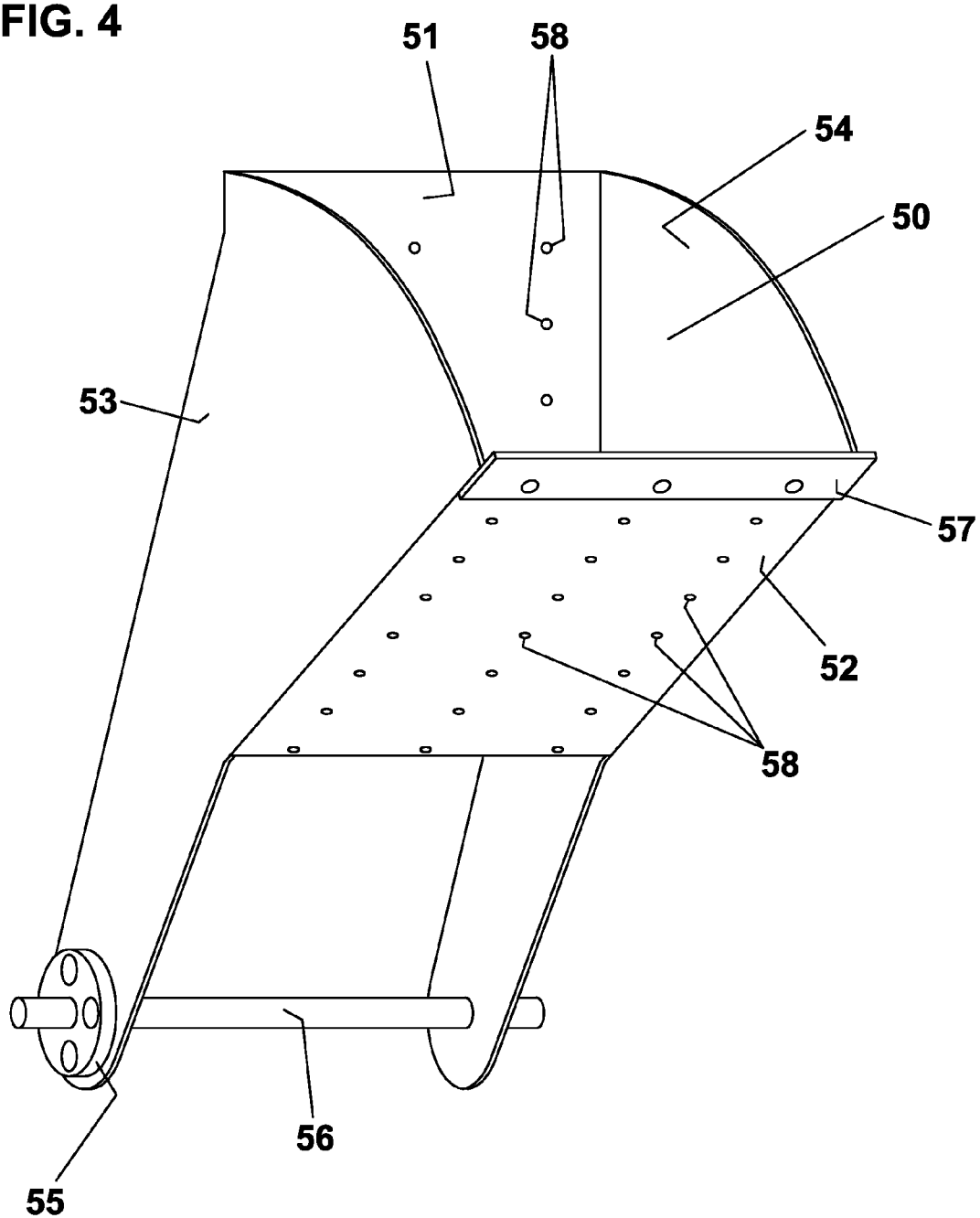
FIG. 4 shows an embodiment of the conveying element for the apparatus according to FIG. 1 in a perspective view.
Figure 5:
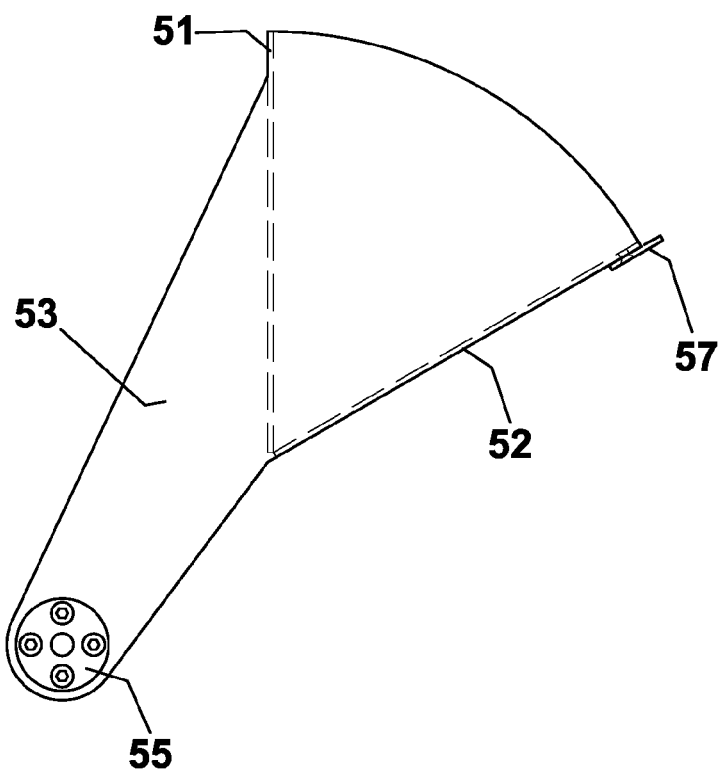
FIG. 5 shows the conveying element from FIG. 4 in a side view.
Figure 6:
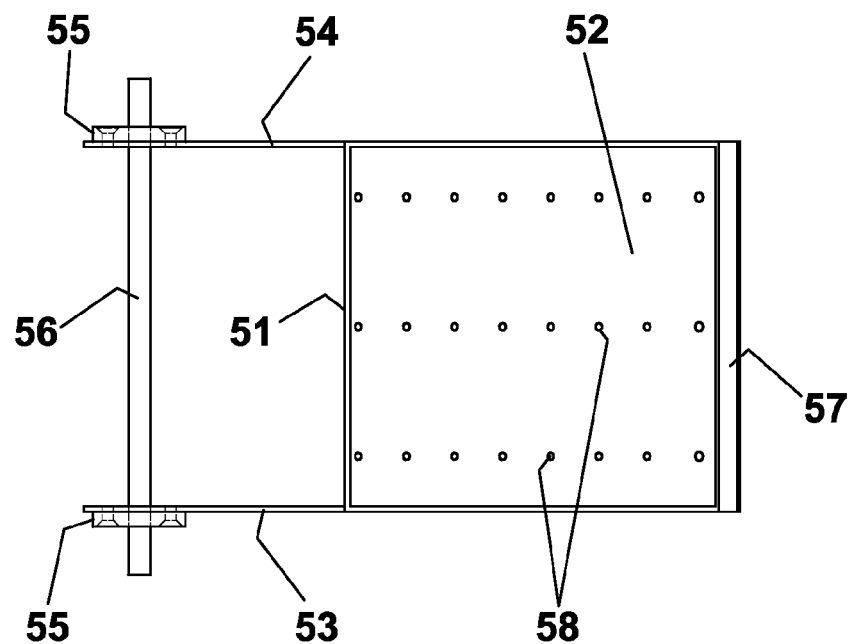
FIG. 6 shows the conveying element from FIG. 4 in a top view.

Here, the conveying element 21 is configured as a scoop, which is shown in greater detail in FIGS. 4-6. The scoop 21 has an accommodation space 50 that is formed by panels 51-54. The panels 51 and 52 are disposed in V shape and attached laterally to the panels 53 and 54, which are provided with bearings 55 on the end side. A shaft 56, which is held on the arm 22 of the conveying device 20, runs through the bearings 55, so that the scope 21 can be rotated about the bearings 55. The scoop 21 can therefore be pivoted about two axes, which pass through the shafts 23 and 56 and run in the Y direction here.

The dimensions of the scoop 21, particularly the distance between shaft 56 and end of the panel 42, are coordinated with the arm 22 in such a manner that the scoop 21 projects over the edge of the basin 21 in the end position shown in FIG. 2, and comes to lie on the chute 29. The position of the shaft 56 is chosen in such a manner that the center of gravity of the scoop 21—viewed in the X direction, i.e. in the direction toward the chute 29—is situated in front of the shaft 56 and thereby an automatic tilting movement of the scoop 21 toward the chute 29 is brought about.

The panel 52, which faces the bottom wall 10c of the basin 10, is provided with a slide part 57 at the edge. This part moves along the bottom wall 10c during operation and is made of plastic, for example. Furthermore, the panel 52 serves as a slide surface, along which the edge of the basin 10 slides when the scoop 21 is moved toward the end position.

The scoop 21 is configured to be permeable, so that liquid can flow out of the accommodation space 50. For this purpose, the panels 51, 52 are provided with holes 58.

The separation apparatus can be operated as follows:

An introduction pipe is positioned above the basin 10, to introduce the liquid with the material to be separated, and a pipe is connected with the connector 42 to form the return flow. The pipe 41 is pivoted in such a manner that the desired level 35 occurs in the basin 10. The conveying element 21 is moved from the starting position to the end position by activating the drive 25. Thereby, the conveying element 21, as it is guided along the bottom wall 10c, picks up material that has settled there.

Control of the separation apparatus is preferably set up in such a manner that the movement of the conveying element 21 is decelerated when it moves toward the end position. In this way, liquid that has been picked up by the conveying element 21, together with the material, can flow out of the holes 58, as soon as it is moved above the level 35 of the liquid. In this connection, the conveying element 21 is pivoted so far that it essentially runs vertically and therefore the opening of the accommodation space is situated at the top (see FIG. 5).

During the further movement of the conveying element 21, the edge of the conveying element 21 guided along the bottom wall 10c (see slide part 57 in FIG. 5) reaches the edge of the basin 10, and subsequently the underside of the conveying element 21 (panel 52 in FIG. 5) slides along the basin edge. Thereby, the conveying element 21 starts to project over the basin edge and slowly tilts forward, because the center of gravity is offset forward.

The arm 22 is finally pivoted so far that the conveying element 21 comes to lie on the chute 29. The opening in the accommodation space 50 of the conveying element 21 is now directed downward, so that the material falls out of the conveying element 21 into the collection container 30 due to gravity.

Subsequently, the conveying element 21 is moved back to the starting position and the cycle begins again. In this connection, the number of cycles per time unit is adjusted to the corresponding amount of material that occurs.

The separation apparatus can be used in different ways to separate material that settles in a liquid. Typically, these are solids that have a greater density than the liquid.

The separation apparatus can be used, for example, for water-jet cutting machines in which abrasive material in the form of sand, for example, is added to the water to form a particularly effective cutting jet. The separation apparatus is disposed in the water circuit between the collection basin, where the water with abrasive material is collected during processing, and the feed of water to the nozzle. The water with abrasive material is passed from the collection basin into the basin 10 by means of a pump; the abrasive material is separated there, and the cleaned water is conducted back into the water feed of the machine, by way of the connector 42.

The separation apparatus can also be used in other types of processing machines, for example to separate chips, grinding particles and the like from lubrication fluid.

The capacity of the basin 10 is designed for the respective purpose of use, i.e. it is variably adapted to the application, and can amount to at least 1 m$^3$, at least 2 m$^3$ or more, for example.

From the above description, numerous modifications are accessible to a person skilled in the art, without departing from the scope of protection of the invention, as defined by the claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A separation apparatus for separation of material from a liquid, the separation apparatus comprising:
    a tank, which is configured to pass the liquid therethrough and which includes a bottom, on which material from the liquid collects during operation, and
    a conveying device including a conveying element, which is movable along the bottom by a drive, the conveying element being configured to pick up material that has collected on the bottom and to convey the material out of the tank, the conveying element being configured to be moved back and forth between a starting position, in which the conveying element is situated within the tank, and an end position, in which the conveying element projects at least partially over an edge of the tank, the conveying element having a center of gravity which is arranged such that the conveying element, when moved toward the end position, is tilted automatically by gravity from the inside of the tank towards the outside of the tank.

2. The separation apparatus according to claim 1, wherein the conveying element is configured to be permeable, so that liquid being picked up is able to flow out of the conveying element.

3. The separation apparatus according to claim 2, wherein the conveying element comprises a plurality of holes.

4. The separation apparatus according to claim 1, wherein the conveying element includes an underside, which slides along the edge of the tank when the conveying element is moved toward the end position.

5. The separation apparatus according to claim 1, wherein the conveying device comprise a pivoting arm, on which the conveying element is pivotable.

6. The separation apparatus according to claim 5, wherein a counterweight is disposed on the pivoting arm, in order to at least partially compensate a weight of the conveying element.

7. The separation apparatus according to claim 6, wherein the pivoting arm includes a first end and a second end, which is arranged opposite to the first end, the conveying element being disposed on the first end, and the counterweight being disposed on the second end.

8. The separation apparatus according to claim 1, wherein the bottom of the tank has a circular cylindrical surface, along which the conveying element is movable.

9. The separation apparatus according to claim 1, wherein the drive is at least one of a linear drive, a drive mounted to pivot and a pneumatic cylinder.

10. The separation apparatus according to claim 1, wherein a pipe is disposed in the tank, by which pipe outflow of the liquid takes place, the pipe being movable to adjust a level of the liquid in the tank.

11. The separation apparatus according to claim 1, wherein the conveying element is configured to be moved between a starting position and an end position, in which material picked up by the conveying element is conveyed out of the tank, and
    wherein the separation apparatus further comprises a controller which is configured to decelerate the conveying element when the conveying element is moved toward the end position.

12. The separation apparatus according to claim 1, further comprising a chute disposed outside of the tank, by which chute material is able to fall down out of the conveying element.

13. The separation apparatus according to claim 1, further comprising a processing machine configured to process workpieces, the processing machine being connected to the tank for introducing a liquid with material to be separated therefrom.

14. A separation apparatus for separation of material from a liquid, the separation apparatus comprising:
    a tank, which is configured to pass the liquid therethrough and which includes a bottom, on which material from the liquid collects during operation; and
    a conveying device including a conveying element and a drive configured to move the conveying element, the conveying element comprising:
        an accommodation space configurd to receive material collected on the bottom, and
        a pivoting arm, on which the conveying element is pivotable so that material collected on the bottom is received in the accommodation space by moving the conveying element along the bottom and conveyed out of the tank by tilting the conveying element, the conveying element having a center of gravity which is arranged such that the conveying element, when moved toward an end position, in which the conveying element projects at least partially over an edge of the tank, is tilted automatically by gravity from the inside of the tank towards the outside of the tank.

15. The separation apparatus according to claim 14, wherein the conveying element is a scoop provided with holes.

* * * * *